Figure 1:
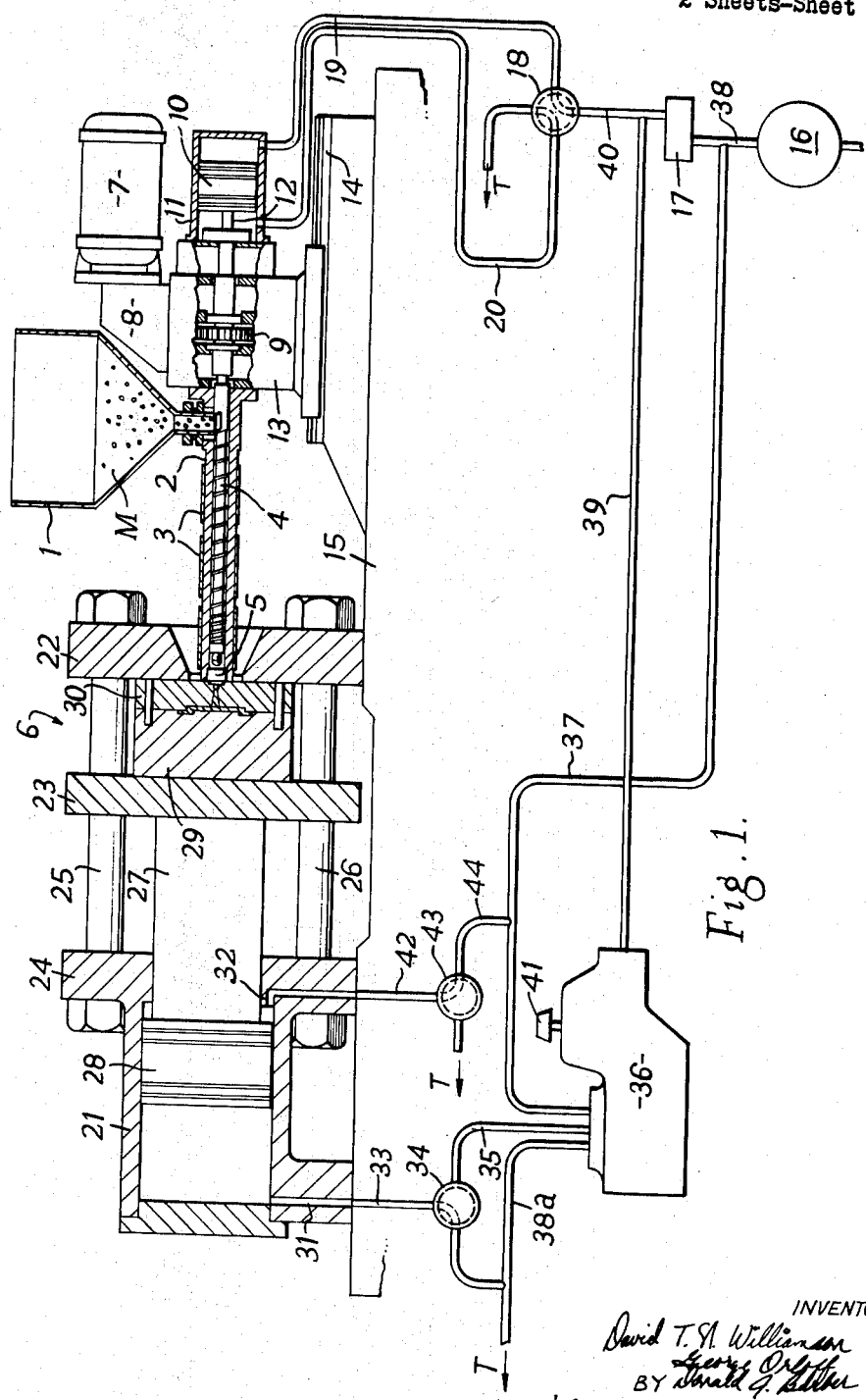

INVENTOR
David T. N. Williamson
George Orr
BY Donald J. Gibbs
Watson, Cole, Grindle & Watson
ATTORNEYS

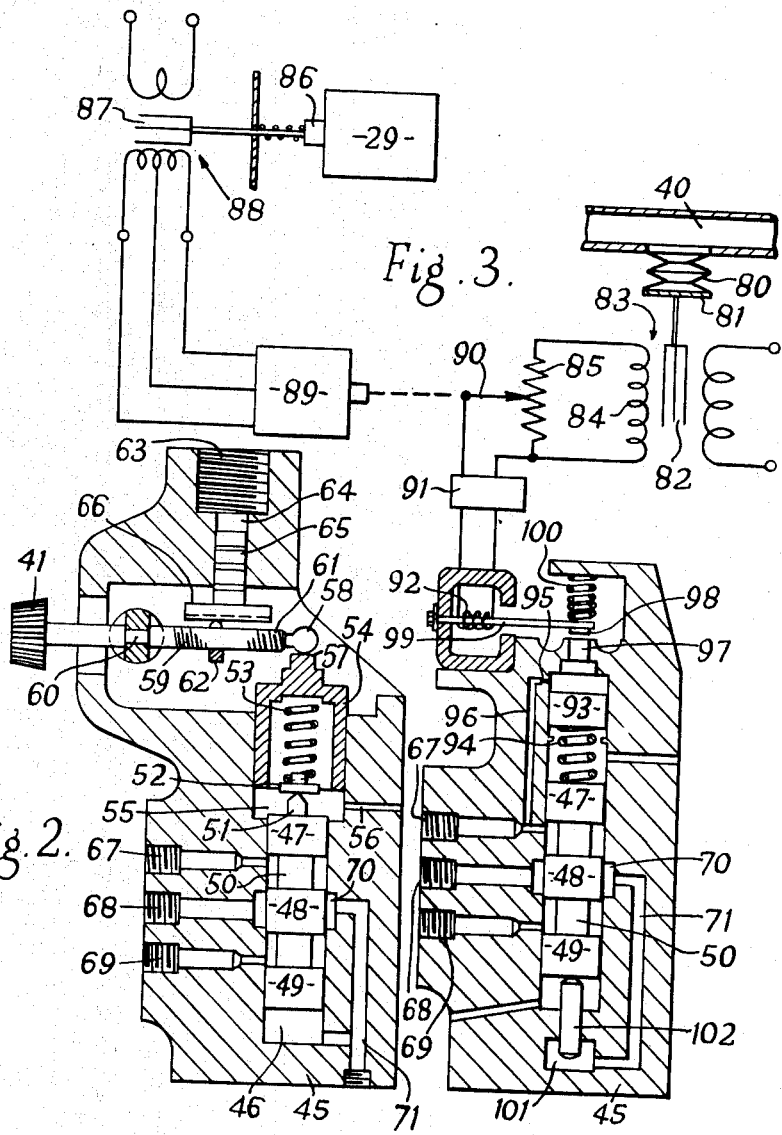

United States Patent Office 3,226,769
Patented Jan. 4, 1966

3,226,769
HYDRAULIC CONTROL SYSTEMS FOR INJECTION MOLDING MACHINES
David Theodore Nelson Williamson, George Orloff, and Donald John Barber, Deptford, London, England, assignors to The Molins Organisation Limited
Filed June 11, 1963, Ser. No. 287,018
Claims priority, application Great Britain, June 13, 1962, 22,706/62
4 Claims. (Cl. 18—30)

This invention concerns improvements in or relating to injection moulding machines and, in particular, to the method of closure of the two halves of the mould.

In a fluid operated injection moulding machine, the two halves of the mould may be locked together during the injection cycle by fluid pressure means, thus eliminating the necessity for mechanical locking, which is frequently of an inflexible nature, such as is involved with the use of a toggle or of some other form of clamp. Usually the locking force is applied to a movable platen by means of a hydraulic jack, the effective stroke of which is variable to conform with the distance occupied by the mould between the movable and a fixed platen. The fluid pressure is fixed. The total force applied is usually calculated to be greater than the estimate of the greatest force likely to be exerted by the plastic material after it is injected into the mould. The latter force is the product of the pressure of the plastic material and the projected mould area, and acts in a direction to force the two halves of the mould apart.

If the injection moulding machine is used for small batch production with a wide range of product sizes, this system of using a constant locking pressure can lead to disadvantages which are not apparent when the machine is used to produce long runs with product sizes varying within a narrow range. A multi-purpose machine with a fixed locking pressure may lead to the strain of certain moulds. When the strain is permanent, the mould may be so damaged as to result in distortion of the moulding cavity, this strain being due to the total locking force acting on a small land area. A machine operating on such a principle may be quite unsuitable for use with moulds made of different materials. This last objection is particularly valid when it is desirable to use both metallic and non-metallic moulds.

According to the invention there is provided an injection moulding machine, wherein plastic material is injected under pressure into a cavity formed in two halves of a mould comprising a multiplier in which a product is formed of quantities associated with the pressure of the plastic material and with the effective area of the mould cavity, servo means in which fluid pressure from an external source is transformed by the product to a proportional pressure, and amplifying means in which the proportional pressure is adapted to create a closing force acting to hold together the two halves of the mould.

Apparatus in accordance ith the invention will now be described by way of example with reference to the accompanying drawings in which:

FIGURE 1 is a sectional view of a diagrammatic representation of a fluid operated injection moulding machine, FIGURE 2 is a section through a multiplier and pressure reducing valve, shown diagrammatically in FIGURE 1, FIGURE 3 is a section through an alternative to that illustrated in FIGURE 2.

Referring first to FIGURE 1, thermoplastic material M is fed to a hopper 1 of an injection moulding machine and is metered by known means, which are not shown, into a heating cylinder 2. Heating elements 3 surround the cylinder 2 and raise its temperature to the required figure. A screw plunger 4 operating within the heating cylinder 2 forces the thermoplastic material M through a nozzle 5 into the cavity of a split mould 6. An electric motor 7 drives the plunger 4 through reduction gearing 8 and a gear sleeve 9 whilst the lateral movement is effected by an hydraulic piston 10 operating within an hydraulic cylinder 11 to force a rod 12 to move the plunger 4. The hopper 1 and the heating cylinder 2 together with its electrical and hydraulic drives are both located on an injection body 13 which is slidable on guides 14 fixed to the body of the machine 15.

Hydraulic fluid is supplied to the cylinder 11 from a pump 16 through a pressure regulating valve 17 and a four-way valve 18, operation of which allows fluid under pressure to be connected either through flexible pipe 19 to the right-hand side of the cylinder 11 or through flexible pipe 20 to the left-hand side. The side of the cylinder not under pressure is connected via the four-way valve 18 to a tank T.

Locking mechanism for holding together the two halves of the split mould 6 comprises an hydraulic cylinder 21 fixed to the body of the machine 15, a fixed platen 22 similarly attached to the body of the machine 15 and a movable platen 23. The cylinder 21 is provided with a cylinder flange 24 which is connected to the fixed platen 22 by means of four tie bars, two of which, 25 and 26, can be seen in FIGURE 1. The movable plate 23 has four holes through which the tie bars pass and is attached to a piston rod 27 of a piston 28 which is slidable within the cylinder 21. Half moulds 29 and 30 are attachable to the platens 23 and 22 respectively. The cylinder 21 has two fluid inlets, an inlet 31 which admits hydraulic fluid to the left hand portion of the cylinder 21, thereby causing the movable platen 23 to move to the right and to close the two half moulds 29 and 30, and an inlet 32 which admits fluid to the right hand portion of the cylinder 21 thereby causing the two half moulds 29 and 30 to open. The inlet 31 is connected by a pipe 33 to a three-way valve 34 and from thence by a pipe 35 to a variable pressure reducing valve 36. High pressure fluid is supplied to the valve 36 along a pipe 37 which is fed from pipe 38 connecting the pump 16 and the pressure regulating valve 17, while low pressure fluid is removed by a tank pipe 38a which is also connected to the three-way valve 34. Two inputs are provided to the valve 36; a regulated pressure pipe 39 which is connected to pipe 40 joining the pressure regulating valve 17 and the four-way valve 18, and a hand setting regulator 41. The inlet 32 is connected via a pipe 42, a three-way valve 43 and pipe 44 to the pipe 37 which delivers high pressure fluid from the pump 16.

Referring to FIGURE 2 a valve body 45 contains a bore 46 in which is free to slide a spool formed from three pistons 47, 48 and 49 joined on a common rod 50. The top of the piston 47 is provided with a projection 51 bearing against a plate 52 which is held against it by the action of a spring 53. The other end of the spring 53 is located against an interior face of a piston 54 which is movable within an enlarged portion 55 of the bore 46 having a vent 56 through the valve body 45. The top of the piston 54 has a projection 57 against which bears a ball end 58 of a lever 59 which is pivoted at 60 to the valve body 45 and having a threaded portion 61. Attached to the lever 59 is the hand setting regulator 41, rotation of which varies the position of a nut 62 along the length of the threaded portion 61.

The top of the valve body 45 is provided with an opening 63 into which the pipe 39 (see FIGURE 1) is screwed. A restricted portion 64 of the opening 63 houses a piston 65 having a plate 66 attached to its bottom. The plate 66 is provided with a groove into which fits the top of the nut 62.

The side of the valve body 45 contains three openings: 67 into which is screwed one end of the pipe 37, 68 into which is screwed one end of the pipe 35, and 69 into which the pipe 38a is fitted. Communicating with the opening 68 is an annular space 70 which in its turn communicates by a hole 71 with the bottom of the bore 46.

The operation of the apparatus is as follows. The two halves of the mould are closed and locked by the piston rod 27. Thermo-plastic material M fed into the hopper 1 is metered, by means which are not shown, so that a desired charge enters the heating cylinder 2 when the screw plunger 4 is at the beginning of its stroke, i.e. in a position to the right as viewed in FIGURE 1. The pressure regulating valve 17 is set by hand to give a desired injection pressure in the fluid operating the hydraulic cylinder 11. This pressure is selected in accordance with the thermo-plastic material used and with other factors such as the temperature setting of the heating elements 3. By starting the motor 7 the plunger 4 is set in rotation allowing the material M to be fed to the front of the cylinder 2. The rotation is then stopped and by manipulating the valve 18 to the position shown in FIGURE 1 fluid at the desired injection pressure is admitted to the space to the right of the piston 10. The plunger 4 accordingly moves to the left and the metered thermo-plastic material M displaces previously heated and plasticised material which is forced through the nozzle 5 into the cavity of the two half moulds 29 and 30. When the required quantity of material has been forced into the mould the piston 10 is locked in position with the force exerted by the injection pressure of the fluid acting on the cross section of the piston 10 being balanced by the force acting in the opposite direction and exerted by the pressure of the thermoplastic material M within the mould cavity acting on the cross-section of the plunger 4. The pressure within the mould cavity is, of course, transmitted through the nozzle 5 to the plunger 4 which remains in its forward position to enable the material M to start cooling and contracting within the mould.

The pressure of the thermo-plastic material M within the mould acts over the projected area of the mould cavity to produce a total opening force which tends to force apart the two half moulds 29 and 30. Since the half mould 30 is attached to the fixed platen 22, this force acts to the left as seen when looking at FIGURE 1 and tends to move the movable platen 23 against the locking force exerted by the piston 28. To prevent movement of the platen 23 the locking force must exceed the force exerted by the material M within the mould cavity but, as explained heretofore, must not exceed it by sufficient force to cause any damage to the two half moulds 29 and 30. It is accordingly the function of the multiplier and variable presure reducing valve 36 to ensure that the pressure of the fluid entering the cylinder 21 in the space to the left of the piston 28 is sufficient to create a locking force of a desired magnitude.

The operation of the multiplier and variable pressure reducing valve will now be described with reference to FIGURE 2. Fluid at high pressure is admitted through opening 67, which is connected by the pipe 37 (FIGURE 1) to the pump 16. As soon as the spool moves downward from the position shown in FIGURE 2 under the action of the spring 53 the space betwen the pistons 47 and 48 causes the high pressure fluid in the opening 67 to be admitted to the annular space 70 and thus pressure to be communicated to the opening 68 and via the hole 71 to the space below the piston 49. High pressure action upwards on the piston 49 overcomes the downward force of the spring 53 and the spool starts to move upwards until the annular space 70 communicates via the space between the pistons 48 and 49 with the opening 69 which is connected via the pipe 38a (see FIGURE 1) with a tank T. Since the opening 68 is always in communication with the annular space 70, it is now also connected to the tank T and the fluid pressure falls accordingly. The spool eventually takes up a position when the pressure on the bottom of the piston 49 is such as to create an upward force which balances the downward force of the spring 53 and since the space below the piston 49 is always in communication with the opening 68, this pressure is the same as the fluid pressure in the opening 68. The opening 68 can be connected to the space to the left of the piston 28 (FIGURE 1) by means of the pipes 35 and 33 and the three-way valve 34.

By varying the downward force exerted by the spring 53 the pressure in the opening 68 can be proportionally varied. The lever 59 and the nut 62 form a point-loaded beam pivoting about the pivot 60 and with a variable load transmitted through the piston 65 and the plate 66. The nut 62 can be moved by rotating the hand setting regulator 41 and thus the point of application of the load can also be varied. Thus a downward force transmitted through the ball end 58 onto the piston 54 is proportional to the product of the pressure transmitted to the opening 63 through the pipe 39 and of the distance of the nut 62 from the pivot 60. Thus the point-load beam and its associated parts form a transducer with two inputs, one input being a fluid pressure operating on the top of the piston 65 and the other input being a distance selected by hand setting of the regulator 41. The fluid pressure is the same as the actuating cylinder injection pressure and is thus a simple function of the pressure of the thermoplastic material M within the mould cavity while the distance or the angular displacement of the regulator 41 and the lead of the threaded portion 61 can readily be made a function of the effective projected area of the mould cavity.

Suitable design features of the multiplier can readily achieve an increased degree of proportionality to one or both of the inputs. In this way a margin of safety can be built into the system whereby the locking force will always exceed the opening force exerted by the thermplastic material within the mould by a required degree of proportionality.

An alternative arrangement which is one of many possible electric, electro-mechanical, hydraulic, or combinations of these arrangements, is illustrated in FIGURE 3 in which like reference numerals refer to like parts. At a convenient position in the pipe 40 a bellows unit 80 is fitted. The bottom of the bellows unit 80 is a diaphragm 81 movement of which is proportional to the fluid presure within the pipe 40. Attached to the diaphragm 81 is the core 82 of a differential transformer 83. Movement of the core 82 which is proportional to the fluid pressure within the pipe 40 determines the voltage in a secondary coil 84 which is connected to the winding of a potentiometer 85.

The half mould 29 is arranged so that the outside dimension in one plane is proportional within a desired degree to the effective cavity area. Bearing against one face having the required dimension from its opposite face is a spring loaded plunger 86 fixed to a core 87 of a second differential transformer 88. The secondary of this transformer 88 is connected to a synchro 89 which is mechanically linked to an arm 90 of the potentiometer 85. The voltage output from the potentiometer 85 is fed to an amplifier 91 the output from which is a variable current to a coil 92.

The arrangemen of the spool within the valve body 45 is similar to that of FIGURE 2. There is, however, an additional piston 93 separated from the piston 47 by a spring 94. The space above the piston 93 communicates via a small bore orifice 95 and a passage 96 to the opening 67. The space above the piston 93 is open to atmosphere by means of a valve seat 97 which can be closed by valve 98 carried on an extension to a core 99 of the coil 92. The valve 98 is normally held in the closed position by a spring 100 fixed to the valve body 45. The passage 71 communicates with a secondary cylinder 101 having a piston 102 the top end of which abuts against the bottom side of the piston 49.

The operation of this alternate arrangement is as follows. A reference voltage is fed to the primary of the differential transformer 83 and yields a secondary voltage, the value of which depends on the position of the core fixed to the diaphragm 81. The diaphragm position is determined by the fluid pressure within the pipe 40 which thus also determines the value of the secondary voltage. This secondary voltage is connected across the winding of the potentiometer 85 the arm 90 of which is varied by the voltage fed to the synchro 89. This latter voltage is the output from the secondary of the second differential transformer 88 and varies according to the position of the core which is fixed to the spring loaded plunger 86. This plunger is arranged to bear against one outside face of the movable half mould 29. The half moulds are so designed that the dimension from a central datum point taken in relation to the four ties bars, of which 25 and 26 are two, bears a constant relationship to the effective cavity area. In this way the movement of the spring loaded plunger 86 is proportional to the cavity area and thus the output from the potentiometer 85 is a voltage which is proporional to the product of the fluid pressure in the pipe 40 and of the effective mould cavity area.

This last voltage is fed to the amplifier 91 the output from which is a variable current operating the core 99 of the coil 92. The position of the valve 98 in relation to its seat 97 is thus fixed by the same product and this relationship in its turn determines the escape of fluid from the space above the piston 93. In this way a variable force acts downwards through the piston 93 and the spring 94 onto the piston 47 and determines as explained before the fluid pressure output through the opening 68.

What we claim as our invention and desire to secure by Letters Patent is:

1. In an injection moulding machine two half moulds, a fluid operated clamping cylinder to close the two half moulds forming a mould cavity, a fluid operated injection cylinder to inject plastic material into the mold cavity, a high-pressure fluid source communicating with said cylinders, a reducing valve to reduce fluid pressure between said source and the clamping cylinder, pressure means responsive to the pressure developed in said mould cavity by said plastic material, a multiplier responsive to said pressure means and to the size of said mould cavity to produce a resultant force acting on said reducing valve, the output pressure from which is proportional to said resultant force.

2. In an injection moulding machine, the reducing valve as claimed in claim 1, comprising a body, a cylindrical opening therein closed at one end, a spool having three spaced pistons and movable within said opening, an annular space around part of said opening, a fluid inlet communicating with said space and connected to said high-pressure fluid source, a communicating port between the closed end of said opening and said space, two fluid outlets communicating with said opening, one said fluid outlet connected to said clamping cylinders and the other said fluid outlet being vented, and compression means acting on the end of said spool at the end of said opening opposite to its closed end, said resultant force acting on said compression means.

3. In an injection moulding machine, a multiplier as claimed in claim 2 comprising a plunger responsive to the pressure developed in said mould cavity and a pivotable beam having a nut against which said plunger bears, the distance of the nut from the fulcrum of the beam being adjustable and the end of the beam bearing against said compression means.

4. In an injection moulding machine, a multiplier as claimed in claim 2 wherein the quantities to be multipled are electrical signals representing the pressure in said mould cavity and the size of said mould cavity and the output from said multiplier is the position of the core of a coil.

References Cited by the Examiner
UNITED STATES PATENTS
2,481,991   8/1949   Ernst _____ 18—30

J. SPENCER OVERHOLSER, *Primary Examiner.*
M. V. BRINDISI, *Examiner.*
WILBUR L. McBAY, *Assistant Examiner.*